May 7, 1935. S. CONTE 2,000,478
ELECTRIC WATER HEATER
Filed March 22, 1933 2 Sheets-Sheet 1

Inventor
Sebastiano Conte.
By Bryant & Lowry
Attorneys

May 7, 1935. S. CONTE 2,000,478
ELECTRIC WATER HEATER
Filed March 22, 1933 2 Sheets-Sheet 2
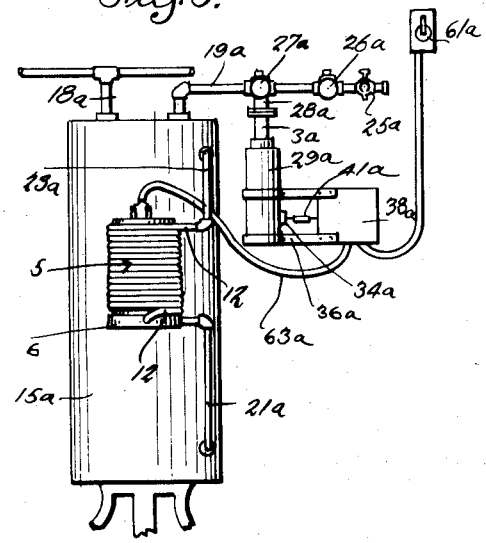
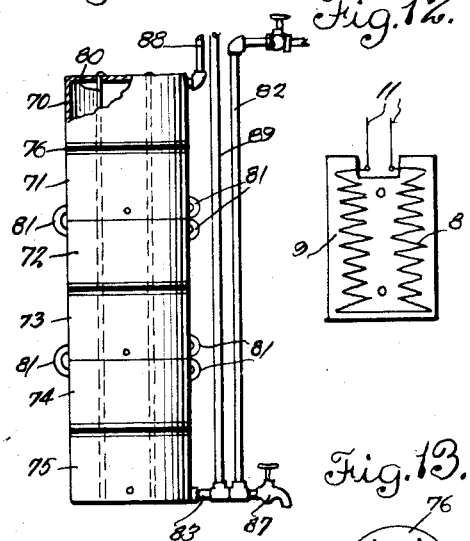
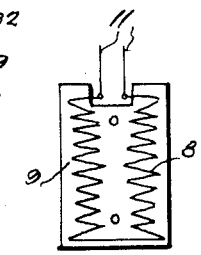
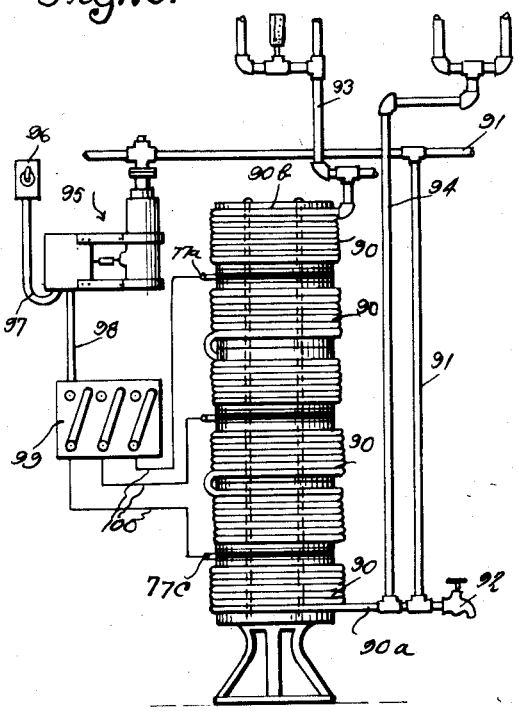
Inventor
Sebastiano Conte.
By Bryant & Lowry
Attorneys Patented May 7, 1935

2,000,478

UNITED STATES PATENT OFFICE 2,000,478

ELECTRIC WATER HEATER

Sebastiano Conte, Princeton, N. J.

Application March 22, 1933, Serial No. 662,161

4 Claims. (Cl. 219—38)

This invention relates to certain new and useful improvements in electric water heaters of the type particularly adapted for domestic purposes.

The primary object of this invention is to provide a novel form of electric heating element which may be used for heating the supply water to a furnace or may be used for heating the water in a stand boiler.

A still further object of this invention is to provide a novel control means for controlling the temperature of the water by cutting in or out the electric heating element as desired.

A still further object of this invention is to provide an electric heating element which may be used with an ordinary furnace employing hot water in lieu of the coal or other fuel such as oil and gas.

A still further object of this invention is to provide an electric heating element arranged in a novel manner relative to water heating coils or tanks to insure the most efficient use of the heat that is generated by the electric heating element.

A still further object of this invention is to provide a water heater which may be formed from a series of receptacles or water coils between which is positioned electric heating units so that the water may be quickly heated with a minimum consumption of current.

Other objects and advantages of the invention will become apparent during the course of the following description, forming a part of this specification and in which, Figure 1 is a front elevational view of an electric water heater embodying this invention, showing the same arranged relative to a hot water heating plant furnace;

Figure 9 is a front elevational view of an electric water heater embodying the invention as shown in Figures 1 to 8 inclusive as applied to a domestic stand boiler;

Figure 10 is a front elevational view of a modified form of electric water heater or stand boiler illustrating the electric heating element or unit interposed between suitable water tanks with circling water coils;

Figure 11 is a front elevational view partly in section of a modified form of water heater or stand boiler;

Figure 12 is a cross-sectional view taken on line 12—12 of Figure 11 looking in the direction of the arrows illustrating the electric heating element or unit interposed between the sections of the stand boiler;

Figure 13 is a transverse cross-sectional view taken on line 13—13 looking in the direction of the arrows of Figure 11, further illustrating the arrangement of the electric heating element or unit;

Figure 14 is a diagrammatic view illustrating the wiring and manner of connecting the several electric heating units in relation to the control therefor;

Figure 15 is a diagrammatic showing of a single switch element for a single heating unit.

Figure 1:
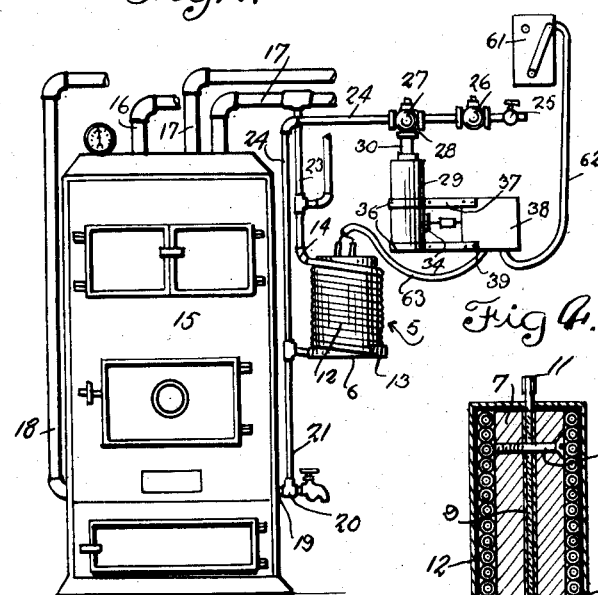
Figure 2:
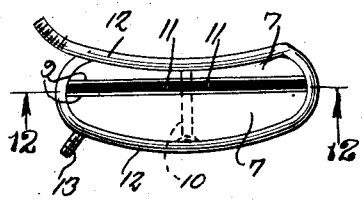
Figure 2 is a top elevational view of the heating element illustrating the water coil surrounding the same and showing the arcuate shape of the heater to allow for the same being placed in close contact with the furnace.

In the drawings, wherein for the purpose of illustrating the invention and wherein like reference characters will be employed to designate like parts throughout the same, the reference character 5 in Figs. 1 to 9 inclusive and Fig. 12 will generally be employed to designate an electric water heater which may be interchangeably connected with a furnace hot water supply pipe as shown in Figure 1 or may be attached to a domestic stand boiler as shown in Figure 9 also for the purpose of heating the hot water supply of a house or building.

The electric water heater 5 comprises a base portion 6 which may be formed hollow and to which may be secured complementary arcuately curved plates 7 formed of metal or other heat conducting material. Interposed between the arcuately curved metal plates 7 is an electric heating element comprising a zig-zag resistance wire 8 suitably insulated from the metallic plates 7 by means of a composition insulation and fire proof substance such as asbestos, 9.

Figures 3, 4:
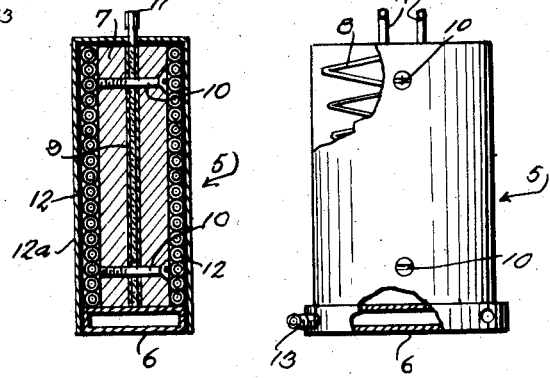
Figure 3 is a front elevational view of the electric water heater showing portions thereof broken away to illustrate details of construction.
Figure 4 is a vertical cross-sectional view taken through the water heater embodying this invention and further illustrating the details of construction.
Figure 5:
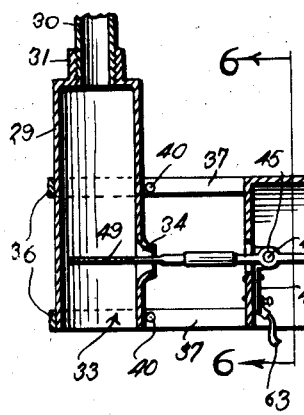
Figure 5 is a vertical cross-sectional view of the automatic circuit controlling switch interposed in the feed water line to the furnace.
Figure 6:
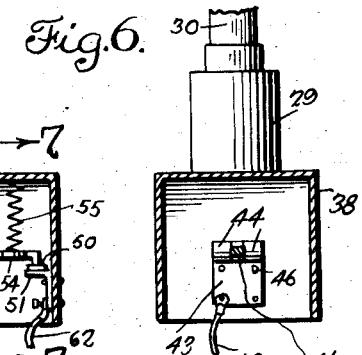
Figure 6 is a vertical cross-sectional view taken on line 6—6 of Figure 5 looking in the direction of the arrows illustrating further details of construction of the circuit controlling means employed in the system.
Figure 7:
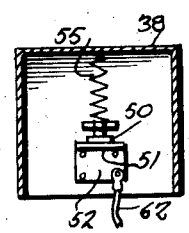
Figure 7 is a vertical cross-sectional view taken on line 7—7 of Figure 5, looking in the direction of the arrows illustrating the contact members of the circuit controlling means.

The arcuately curved complementary plates 7 are fastened by screws 10 so that the electric heating element 8 will be securely fastened therebetween. Suitable electrodes 11 are provided on the electric heating element for connecting the same in a suitable source of current supply. Encircling the metallic complementary plates 7 is a hot water pipe or coil 12 having its lower end connected to the chamber 6 as at 13 and being coiled around the plates 7 from the bottom portion thereof to nearly the top thereof where the pipe coils terminate in a union 14. An insulation casing 12a incloses the water coil 12 as shown in Figure 4. It will be evident that heat created by the electric heating unit 8 will be transmitted through the matallic plates 7 to heat the water contained in the water coil 12 and thereby furnishing a running hot water supply to the house or building.

As shown in Figure 1, the electric water heater 5 is applied to a furnace 15 of the usual hot water type having the conventional return pipe 16 and supply pipes 17 for connection to the radiators in the house or building. Usually in connection with furnaces of this type it is common practice to provide a coil in the firebox for furnishing running hot water to the faucets of the house and it is the intention of this invention to eliminate the use of such a coil in the fire box so that hot water may be had at all times during the different seasons of the year regardless of whether fire is kept in the furnace or not.

The furnace is provided with a cold water supply pipe 18 in the bottom portion of the boiler which may have one end connected to the street water supply for furnishing the system with water as it is used from the system. Also secured to the lower portion of the boiler is a pipe connection 19 having the usual spigot connected to the pipe connection 19 by a T-joint 20. A pipe 21 connects the T-joint 20 to the lower chamber 6 of the water heater as at 22 for the purpose of feeding water to the chamber 6 and through the water coil 12. The water passes upwardly through the union 14 and is then conducted to the hot water running supply of the house or building by means of a pipe 23 in communication with the pipe 17. A temperature control apparatus for the water includes a pipe 24 in communication with the pipe 21 and has a drain valve 25 and a stop cock 26 set therein. The pipe 23 is connected to one or both of the hot water supply pipes 17.

The control mechanism is illustrated in detail in Figures 5 to 8 and includes a condenser 27 set into the pipe 24 and has a downwardly extending flanged pipe 28 to which is connected a control chamber 29 by means of a pipe 30 having a screw threaded connection 31 with the chamber 29 and being fastened to the flanged pipe 28. The lower portion of the chamber 29 is open as at 33 and on one side thereof adjacent the opening there is formed a hollow boss. Passing around the control chamber 29 is a metallic band 36 having laterally extending portions 37 whereby the free ends thereof may be connected in the usual manner to a switch housing 38 as at 39. The metallic bands 36 may be fastened by means of screws or rivets 40 to securely clamp the switch casing 38 in position relative to the control chamber 29.

Figure 8:
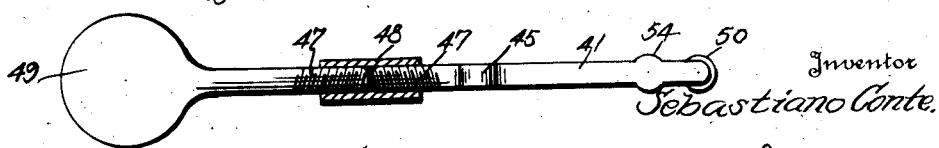
Figure 8 is an enlarged view of the switch arm and operating means showing a portion thereof in section to illustrate the details of construction.

An arm 41 is pivotally mounted as at 42 on a contact plate 43 within the housing 18 and has a bifurcated end which is looped as at 44. The pivoted lever 41 passes between the bifurcated looped portion 44 of the plate 43 so that a pintle or shaft may extend through the loops 44 and an intermediate looped portion 45 of the lever 41. The hinge plate 43 may be secured to the casing 38 by means of screws or rivets 45. An opening is formed in one side wall of the casing 38 so that the pivoted lever 41 may extend therethrough and may also extend through the opening 35 formed in the hollow boss 34. The pivoted lever 41 shown in detail in Figure 8 is formed in sections including oppositely screw threaded portions 47 connected by a correspondingly screw threaded sleeve 48 so that turning of the sleeve may elongate or decrease the length of the pivoted lever.

On one end of the pivoted lever 41 is formed a circular flat portion 49 which is adapted to extend into the control chamber 29 so that water of condensation dropping from the condenser 27 will pass through the tube 30 and fall upon the circular flat portion 49 thereby tending to pivot the lever 41 about its pivot point 42. On the end of the pivoted lever 41 there is provided a contact 50 normally held in engagement with a stationary contact 51 which includes an angle plate 52 secured to the side wall of the switch housing 38. Also formed on this end of the lever 41 is a flat portion 54 adapted to be engaged by a coil spring 55, the opposite end of which abuts against the top wall of the switch housing 58 to normally engage the contacts 50 and 51.

The manner in which the circuit means is associated with the electric water heater is as follows: A suitable house current power line supply is in communication with the switch 61 in the usual manner, a conductor 51 while a conductor 63 from the contact plate 43 leads to the terminals 11 of the heating unit 8. When the switch 61 is turned on the current will flow through the electric heating unit by reason of the fact that the contacts 50 and 51 are closed by means of the coil spring 55. As soon as the water passing through the water coil 12 has reached a predetermined temperature, the condenser 27 will create water of condensation which will drop through the tube 30 and will impinge upon the circular flat portion 49 of the pivoted lever 41 thereby tending to tilt the same upon its pivot point 42 to break the circuit through the electric heating unit by the separating of the contacts 50 and 51.

In Figure 9 the same invention is shown as applied to a domestic stand boiler 15a having a water feed supply pipe 18a and the hot water outlet supply pipe 19a. The electric water heater 5 is of the same construction as shown in Figures 1 to 4 inclusive and the lower chamber 9 thereof is connected to the lower portion of the stand boiler 15a by means of a pipe connection 21a while the free upper end of the water coil 12 is connected to the upper portion of the stand boiler by means of a connection 23a. Electric current passing through the heating unit will heat the water within the stand boiler 15a so that the same may be fed to the faucet in the house or building through the hot running water pipe 19a. Interposed in the hot water running pipe 19a is a condenser 27a, check valve 26a and drain cock 25a. Extending downwardly from the condenser 27a is a pipe 28a having a flanged portion for connection to a control chamber 29a by means of a similarly flanged pipe 30a. The control chamber 29a is of the same construction as shown in Figures 1, 5, 6, 7 and 8 and is provided with a hollow boss 34a for the passage of the pivoted lever 41a pivoted inside of the switch housing 38a supported from the control chamber 39a by means of suitable bands or brackets 36a.

A source of energy leads to the switch 61a and the conductor 62a from the switch 61a leads to a terminal contact in the switch housing 38a. The conductor 63a leads from the other terminal contact in the switch housing to the terminals 11 of the heating unit 8.

The operation of the electric water heater as shown in Figure 9 is substantially identical with the form shown in Figures 1, 2, 3 and 4.

In Figures 9 and 13 is shown a modified form of the invention in which the stand boiler may be formed in sections 70, 71, 72, 73, 74 and 75 and each section includes a container having the general resemblance of a drum circular in horizontal cross-section. Interposed between the sections 70 and 71 is an electric heating unit which includes a sheet disk of insulation 76 on opposite sides of which are resistance wires 77 having terminals 78 as shown in Figure 13, the vertical tie rods 80 extend through the sections 70 to 75 for securely clamping the sections together. Each of the units is separated and the sections thus formed are all connected by means of water pipes 81 so that water communication may be established between the several sections 70 to 75 inclusive. The valve controlled water service feed pipe 8a communicates with the lower section 75 by means of a pipe 83 for charging the system with water and has a drain faucet 87 for draining the system. The heated water in the sections 70 to 75 passes upwardly as it is heated by the electric heating elements 77 and passes outwardly of the upper section 70 by way of the pipe 88 to the heater elements, the return of the water being by way of the pipe 89 communicating with the pipe 83 at the lower section 75.

In the form of the invention illustrated in Figure 10 there is provided a plurality of connected water tanks or sections as shown in Figure 11 having heating elements 76—77 interposed between the sections. A continuous pipe coil formed of coiled sections 90 surrounds the water tank, the lower coil 90a of the lower coiled section 90 being in communication with a water service pipe 91 that has a drain valve 92. The upper end 90b of the upper coil section 90 communicates with a pipe 93 leading to the heater element such as radiators or the like while a return pipe 94 from the radiators communicates with the lower section 90a of the lower coil 90. A water temperature regulating device 95 similar to the form illustrated in Figures 1 to 8 is associated with the water service pipe 91 and is diagrammatically illustrated in Figure 14. A source of energy is in communication with the main switch 96 having a conductor 97 leading to the regulator 95 while the conduit 98 from the regulator 95 communicates with a three arm switch 99 respectively having independent line wire connections 100 with resistance elements 77a, 77b and 77c. By the provision of the three arm switch 99 either one or any combination of the resistance elements 77a, 77b and 77c may be cut in for heating purposes.

A single switch device is illustrated in Figure 15 comprising the main switch 96c, the temperature regulator 95a and the single resistance element 77d.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. An electric water heating system comprising an electric heating unit placed in close relation to the water carrier and including a normally closed switch element, and an operating lever for the switch element including a disk plate upon which water of condensation is adapted to fall for pivotally moving the lever and opening the switch and said lever being automatically returnable to switch closing position in the absence of flow of water of condensation.

2. An electric water heating system comprising a water coil, an electric heating unit placed in close relation to the water coil and including a normally closed switch element, and an operating lever for the switch element including a disk plate upon which water of condensation is adapted to fall for pivotally moving the lever and opening the switch and said lever being automatically returnable to switch closing position in the absence of flow of water of condensation.

3. An electric water heating system comprising a water boiler, a water coil connected to the boiler, an electric heating element associated with the water coil and including a normally closed circuit with a switch element therein, said switch element including an operating lever for the switch, a spring engaged with the lever for moving the same into operative position for closing the switch and a flat plate carried by one end of the lever upon which water of condensation falls for operation of the lever and opening of the switch, the lever returning the switch to its closed position under influence of the spring in the absence of flow of water of condensation.

4. In an electric water heating system, a water carrier, an electric heating unit in close relation thereto, a control switch for the heating unit, and means for maintaining the water at a substantially constant temperature including a member for the operation of the switch adapted to be acted upon by the flow of water of condensation in contact therewith for opening the switch and closing the switch in the absence of flow of water of condensation.

SEBASTIANO CONTE.